(12) United States Patent
Tsai

(10) Patent No.: US 7,670,041 B2
(45) Date of Patent: Mar. 2, 2010

(54) BACKLIGHT MODULE

(75) Inventor: Kun-Jung Tsai, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 336 days.

(21) Appl. No.: 11/525,462

(22) Filed: Sep. 22, 2006

(65) Prior Publication Data

US 2007/0201244 A1     Aug. 30, 2007

(30) Foreign Application Priority Data

Feb. 24, 2006    (CN) .................. 2006 1 00033949

(51) Int. Cl.
    *F21V 7/04*    (2006.01)
(52) U.S. Cl. ............. 362/625; 362/609; 362/612; 362/613; 362/622; 362/623; 362/624; 362/627
(58) Field of Classification Search ........... 362/609, 362/612–613, 622–625, 627
    See application file for complete search history.

(56) References Cited

U.S. PATENT DOCUMENTS 5,363,294 A    11/1994    Yamamoto et al.

2004/0136173 A1 *  7/2004  Tsai ..................... 362/31

FOREIGN PATENT DOCUMENTS

| CN | 1510437 | 7/2004 |
|----|---------|--------|
| CN | 1510439 | 7/2004 |

* cited by examiner

*Primary Examiner*—Sharon E Payne
*Assistant Examiner*—Sean P Gramling
(74) *Attorney, Agent, or Firm*—Clifford O. Chi

(57) ABSTRACT

A backlight module (10) includes a light source and a light guide plate (12). The light source defines a number of light units (11) for emitting light beams. The light guide plate includes a light incident surface (121), an emission surface (123) adjacent to the light incident surface, a bottom surface (124) opposite to the emission surface, a plurality of side surfaces (122) between the emission surface and the bottom surface, and a plurality of diffusion units (13) formed on the bottom surface. A dot size of each diffusion unit/dot is inversely proportional to a summation of the sum of reciprocals of squares of distances between the diffusion unit and each of the light units and the sum of reciprocals of squares of distances between the diffusion unit and corresponding images of each of the light units formed, respectively, by the side surfaces.

10 Claims, 4 Drawing Sheets

BACKLIGHT MODULE

BACKGROUND

1. Technical Field

The present invention relates to backlight modules typically used in liquid crystal displays (LCDs) and, more particularly, to backlight modules with highly uniform illumination.

2. Description of the Related Art

Color LCD devices have been widely used in various applications, such as in portable personal computers, LCD televisions, video built-in type LCDs, etc. A conventional LCD device mainly includes a backlight module and a liquid crystal panel. An under-lighting system or an edge-lighting system is used as the backlight module. In an under-lighting system, a light source is disposed under a diffusion plate, and the diffusion plate is disposed under the liquid crystal panel. In an edge-lighting system, a light source is disposed at a side surface of a light guide plate (LGP), and the LGP is disposed under the liquid crystal panel.

Typically, an edge-lighting system includes an LGP and a light source. The LGP is formed from a planar transparent member, such as an acrylic resin plate or the like. Light beams emitted from the light source are transmitted through a side surface (i.e., light incident surface) of the LGP into the LGP. Most of the incident light beams are internally reflected in the LGP between a light emission surface and an opposite bottom surface of the LGP and are then transmitted more or less uniformly out through the light emission surface of the LGP. A plurality of light diffusion dots, having a light scattering function, are advantageously formed on the bottom surface, in order to increase the uniformity of illumination of the backlight module. The light source is usually at least one linear source, such as a cold cathode fluorescent lamp (CCFL), or at least one point source, such as a light emitting diode (LED).

The configuration of the diffusion dots is key to good optical performance of the LGP. Thus, various configurations of diffusion dots of LGPs have been devised recently. FIGS. 9 and 10 show a conventional backlight module including an LGP 22, a CCFL 21, a reflection sheet 25, a prism sheet 27, and three side reflectors 29 (only one shown). The LGP 22 has a light incident surface 223, a bottom surface 222, an emission surface 221, and three side surfaces 224, 225. The CCFL 21 is arranged adjacent to the light incident surface 223. The reflection sheet 25 is placed under the bottom surface 222. The prism sheet 27 is set above the emission surface 221. One of the side reflectors 29 is arranged adjacent to the side surface 224. The other two side reflectors 29 are aligned respectively adjacent to their two corresponding side surfaces 225. A plurality of diffusion dots 26 are provided on the bottom surface 222, generally in a regular array of rows and columns. The diffusion dots 26 are ordered in a manner such that sizes thereof in a first main region A of the bottom surface 222 increase with increasing distance away from the CCFL 21, and sizes thereof in a second region B of the bottom surface 222 adjacent to the side surface 224 are the same. The sizes of the diffusion dots 26 in region B are substantially the same as a size of those diffusion dots 26 in region A that are adjacent to region B. The diffusion dots 26 in any column of the array parallel to the CCFL 21 have a similar size.

Generally, CCFL 21 light intensity in region A decreases with increasing distance away from the CCFL 21. Thus, the configuration of the diffusion dots 26 in region A can increase the uniformity of illumination on the emission surface 221 of the LGP 22, because intensity of light beams emitted from the emission surface 221 is substantially proportional to the sizes of the corresponding diffusion dots 26.

However, illumination in both regions A and B is uneven. One reason for this is because light beams are reflected by the side reflector 29 from region A back into region B, and the columns of the diffusion dots 26 in region B are spaced different respective distances from the side reflector 29. That is, the diffusion dots 26 in respective different columns in region B receive light beams having different intensities. Therefore, light beams do not emit uniformly from the part of the emission surface 221 corresponding to region B. Another reason is that the two side reflectors 29 that are adjacent to the two side surfaces 225 have a similar effect to the above-described operation of the side reflector 29 that is distal from region A. This contribution by these side reflectors 29 results in further uneven illumination between the side surfaces 225, in both regions A and B. Therefore, light beams do not emit uniformly from the part of the emission surface 221 corresponding to both regions A and B (i.e., the entire emission surface 221 of the LGP 22). In summary, respective distributions of the diffusion dots 26 in regions A and B result in non-uniform illumination over the whole emission surface 221 of the LGP 22.

Furthermore, if the CCFL 21 is replaced by a series of point sources such as LEDs, the uniformity of illumination of the backlight module is generally unsatisfactory. That is, the limited lighting characteristics of the LEDs result in a plurality of darker areas, generally between adjacent LEDs, being created in the LGP 22. In conclusion, it is very problematic to provide even illumination throughout the entire emission surface 221 of the LGP 22.

What is needed, therefore, is a backlight module that overcomes the above-mentioned problems and thereby provide more even illumination throughout the entire emission surface of a given LGP.

SUMMARY

A backlight module, according to one preferred embodiment, includes a light source and a light guide plate. The light source defines a plurality of light units for emitting light beams. The light guide plate includes a light incident surface configured for receiving the light beams from the plurality of light units; an emission surface adjacent to the light incident surface, the emission surface being structured and arranged (i.e., configured) for emitting the light beams; a bottom surface opposite to the emission surface; a plurality of side surfaces connectively extending between the emission surface and the bottom surface; and a plurality of diffusion units formed on the bottom surface, the diffusion units being respectively configured for scattering the light beams. A size of each diffusion unit is inversely proportional to summation of the sum of reciprocals of squares of distances between the diffusion unit and each of the light units and the sum of reciprocals of squares of distances between the diffusion unit and corresponding images of each of the light units formed respectively by the side surfaces.

Other advantages and novel features will become more apparent from the following detailed description of present backlight module, when taken in conjunction with the accompanying drawings.

BRIEF DESCRIPTION OF THE DRAWINGS

Many aspects of the present backlight module can be better understood with reference to the following drawings. The components in the drawings are not necessarily drawn to scale, the emphasis instead being placed upon clearly illustrating the principles of the present backlight module. Moreover, in the drawings, like reference numerals designate corresponding parts throughout the several views.

DETAILED DESCRIPTION OF PREFERRED EMBODIMENTS

Reference will now be made to the drawings to describe preferred embodiments of the present backlight module, in detail.

Figure 1:
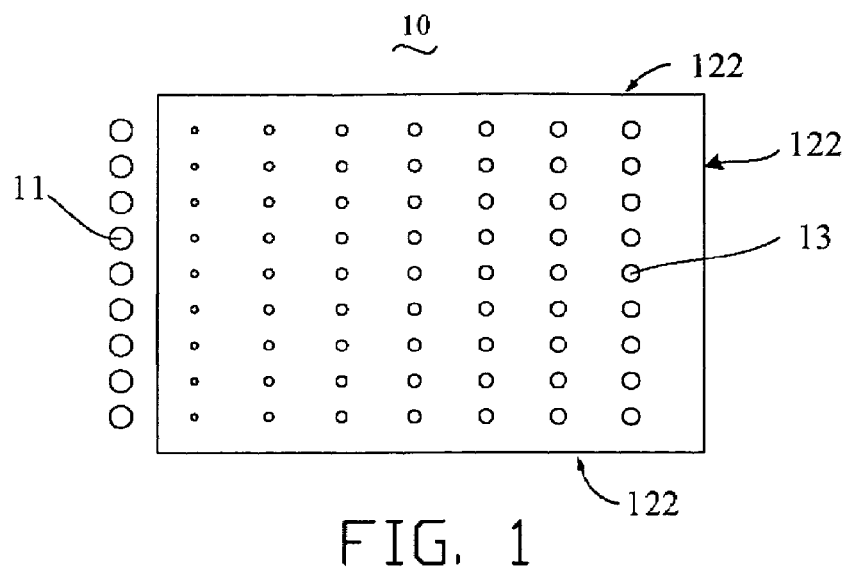
FIG. 1 is a schematic, bottom elevation of a first embodiment of a backlight module, the backlight module including a line of point light sources and an LGP.
Figure 2:
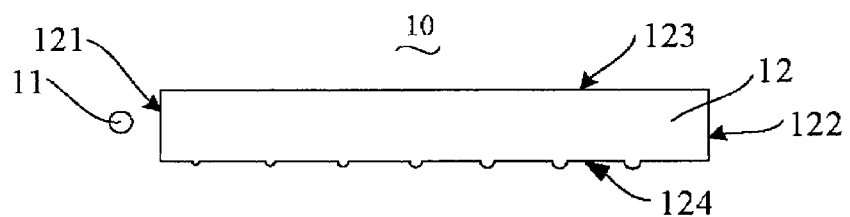
FIG. 2 is a schematic, side elevation of the backlight module of FIG. 1.

Referring to FIGS. 1 and 2, a backlight module 10, according to a first embodiment, includes a plurality of point sources 11 (i.e., point light sources) arranged in a line and an LGP 12 used for transmitting light received from the point sources 11. The point sources 11 can be LEDs, mercury lamps, or like apparatuses. In this embodiment, the point sources 11 are LEDs.

Figure 9:
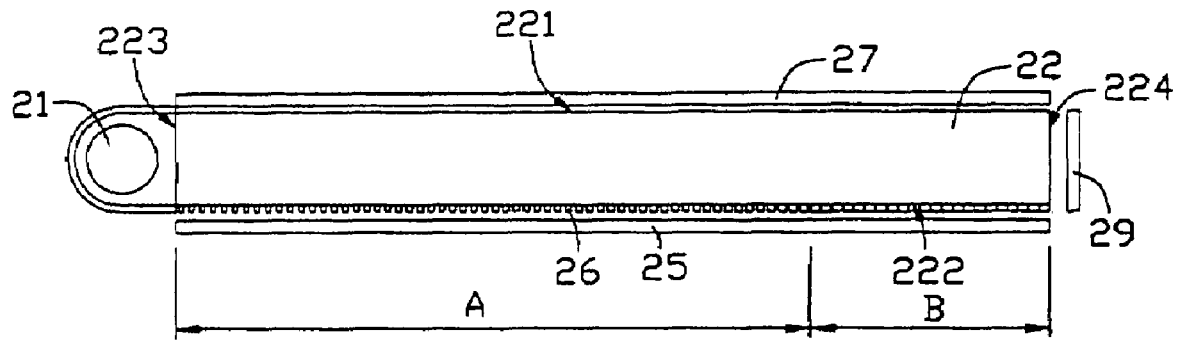
FIG. 9 is a schematic, side elevation view of a conventional backlight module.
Figure 10:
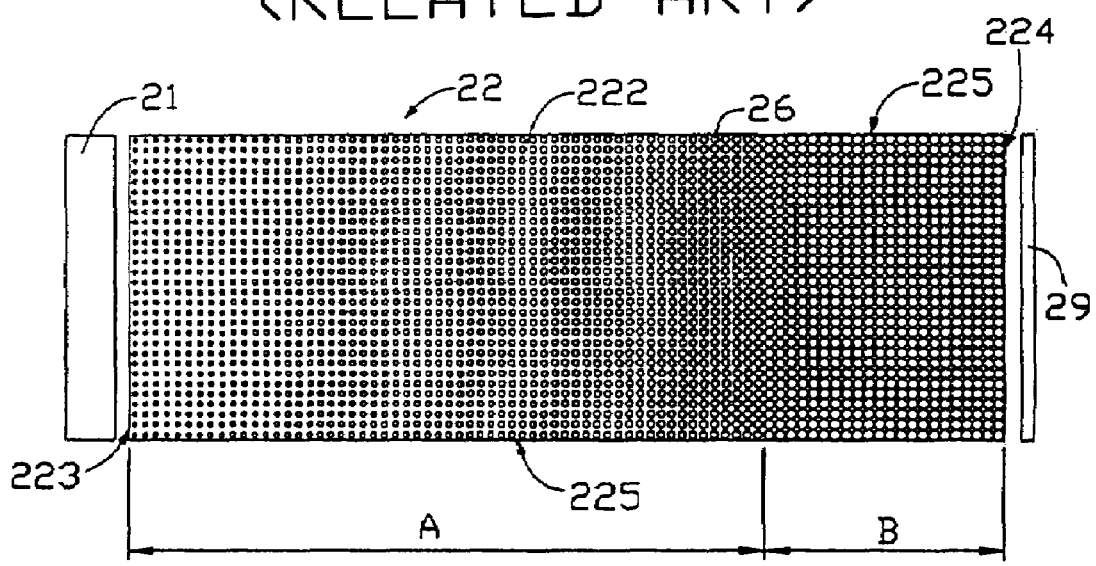
FIG. 10 is a schematic, bottom elevation view of the backlight module of FIG. 9.

The LGP 12 is a rectangular transparent plate and includes a light incident surface 121; three side surfaces 122; a top emission surface 123, adjacent and perpendicular to both the light incident surface 121 and the side surfaces 122; and a bottom surface 124, opposite to the emission surface 123 and adjacent both the light incident surface 121 and the side surfaces 122. A plurality of diffusion dots 13 are formed on the bottom surface 124. A thickness of the LGP 12 is preferably in the range from approximately 1 millimeter to 10 millimeters. The point sources 11 are disposed adjacent to the light incident surface 121. The backlight module 10 further includes three reflectors (similarly to reflectors 29 of FIG. 9) positioned on corresponding side surfaces 122, adjacent thereto and/or in contact therewith, of the LGP 12 so that the side surfaces 122 are reflective surfaces. Alternatively, a plurality of reflective films can be respectively coated on the corresponding side surfaces 122 of the LGP 12 in order to make the side surfaces 122 reflective.

Transparent glass material or synthetic resin may be used for making the LGP 12. Various kinds of highly transparent synthetic resins may be used, such as acrylic resin, polycarbonate resin, vinyl chloride resin, etc. The selected resin may be molded into a plate using known molding methods such as extrusion molding, injection molding, or the like. In particular, polymethyl methacrylate (PMMA) resin provides excellent light transmission, heat resistance, dynamic characteristics, molding performance, processing performance, etc. Thus, it is especially suitable as a material for the LGP 12.

The diffusion dots 13 are, advantageously, generally hemispherical. That is, a bottom elevation (i.e., view from bottom upwards) of each diffusion dot 125 is a circle, the circle defining a dot area. In alternative embodiments, the diffusion dots 13 may be generally sub-hemispherical, cylindrical, parallelepiped-shaped, pyramidal or frustum-shaped. The diffusion dots 13 are, beneficially, arranged convexly on the bottom surface 124 (i.e., protruding directly from the bottom surface 124) in a generally uniform array of rows and columns. The diffusion dots 13 can be formed by means of an integral molding technique or a printing technique. In this embodiment, the diffusion dots 13 are formed by the integral molding technique and are formed integrally with the LGP 12.

Figure 3:
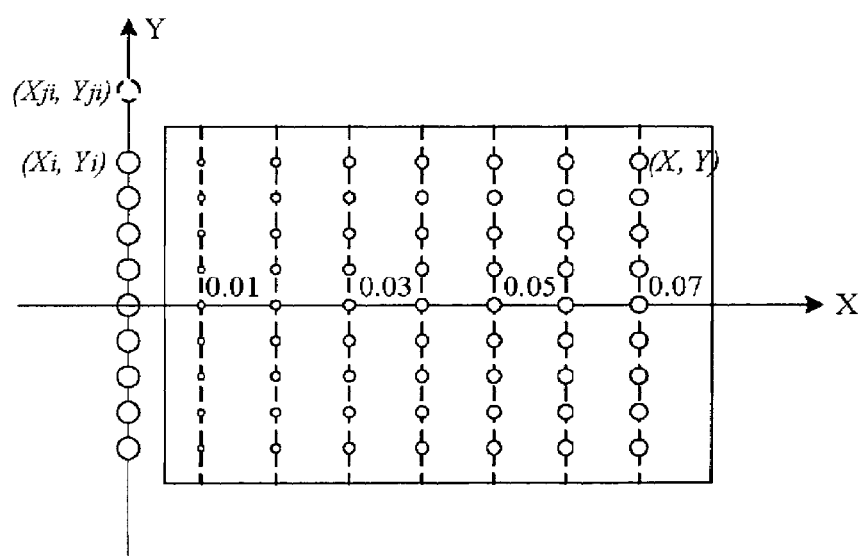
FIG. 3 is a schematic, bottom view of the light guide plate of FIG. 1, showing the LGP and the point light sources, located in a Cartesian coordinate system.

Also, referring to FIG. 3, the dot area of each diffusion dot 13 is inversely proportional to the summation of the sum of reciprocals of squares of distances between the diffusion dot 13 and each of the point sources 11 and the sum of reciprocals of squares of distances between the diffusion dot 13 and corresponding images of each of the point sources 11 formed by the side surfaces 122. This relationship is expressed by the following equation:

$$D = \dfrac{k}{r_0 + \sqrt{\sum_{j=1}^{m}\sum_{i=1}^{n} f_h \dfrac{1}{(X-X_{ji})^2 + (Y-Y_{ji})^2} + \sum_{i=1}^{n} \dfrac{1}{(X-X_i)^2 + (Y-Y_i)^2}}},$$

wherein D designates the dot size, such as radius, of the diffusion dot 13; (X, Y), ($X_i$, $Y_i$), and ($X_{ji}$, $Y_{ji}$), respectively, represent coordinates of the diffusion dot 13, coordinates of the point sources 11, and coordinates of images of the point sources 11 relative to the side surfaces 122 in a Cartesian coordinate system; m equals the number of side surfaces 122; n corresponds to the number of point sources 11; $f_h$ designates the reflectivity of a corresponding side surface 122; i and j each represent the series of integers 1, 2, 3, etc.; and $r_0$ and k are constants whose values are related to predetermined specifications of the LGP 12, the point sources 11 and distances between the point sources 11 and the LGP 12. Generally, $r_0$ can be used for limiting the smallest dot size of the diffusion dot. In practice, optimal values of $r_0$ and k can be determined via simulating operation of the LGP 12, using optical simulating software such as SPEOS software. The systematic variation of the dot sizes D of the diffusion dots 13 enable the backlight module 10 to provide highly uniform illumination.

Figure 4:
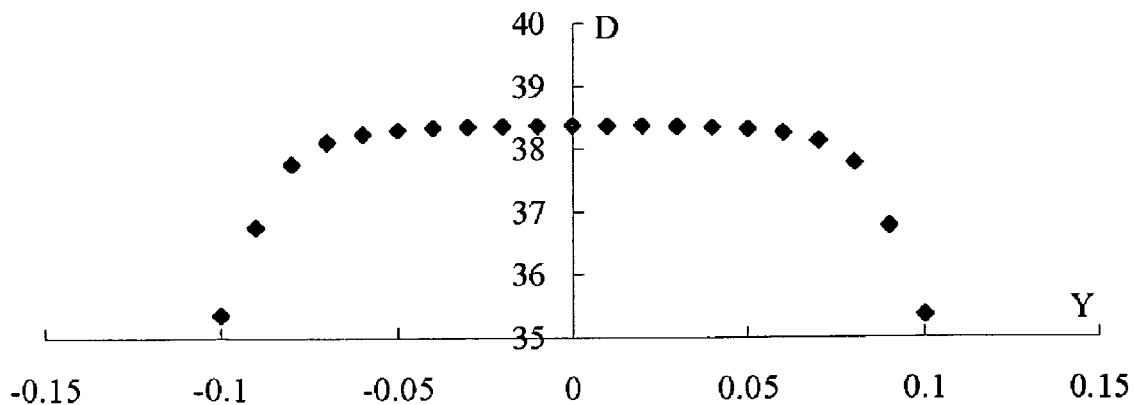
FIGS. 4 to 7 illustrate the relative sizes of diffusion dots on the LGP of FIG. 1 along different cross sections.
Figure 5:
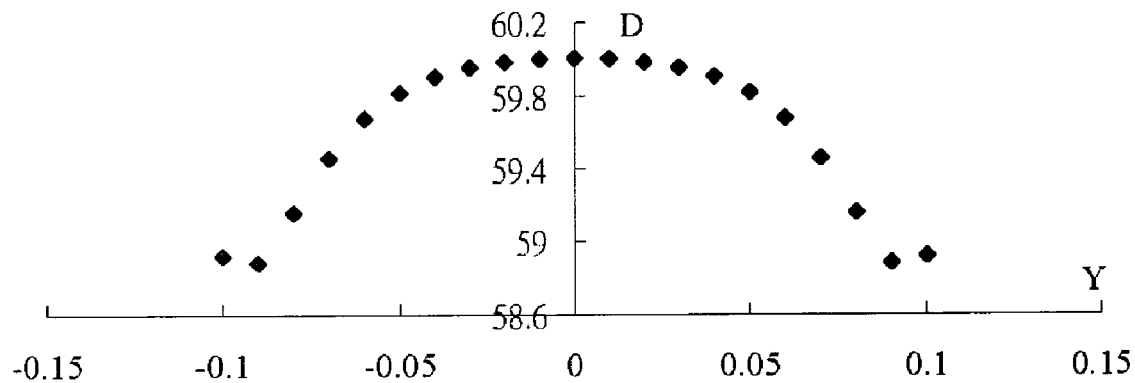
Figure 6:
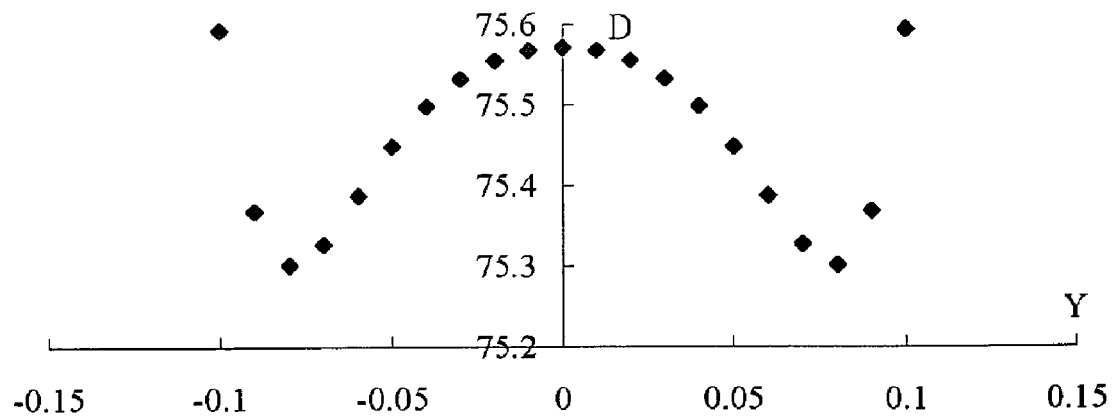
Figure 7:
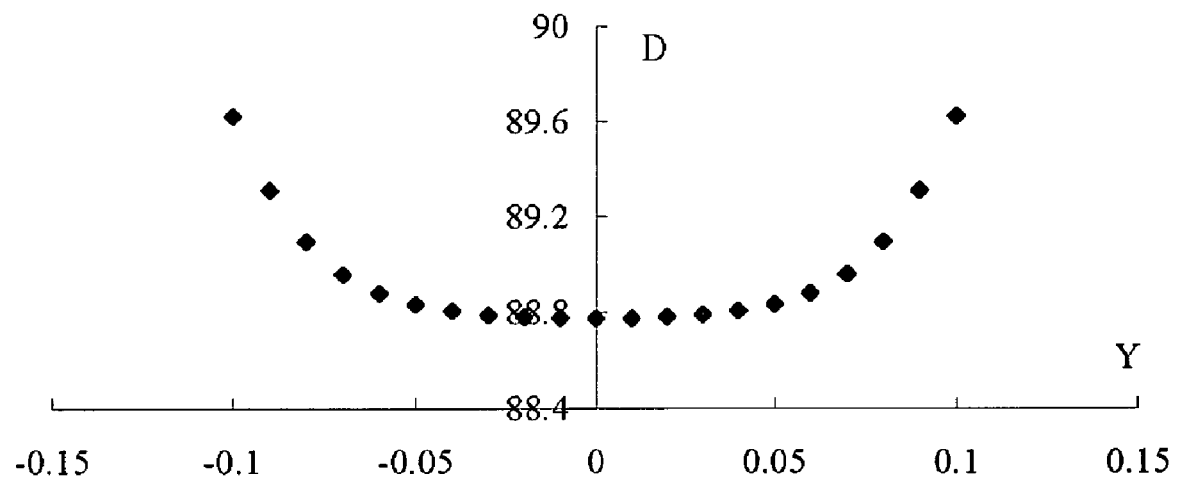
Figure 8:
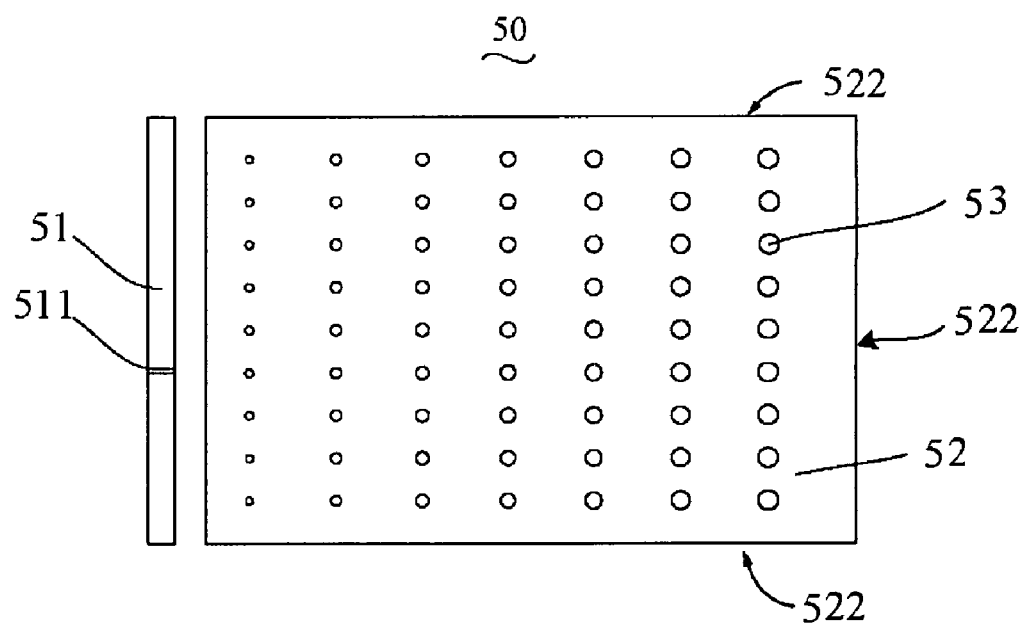
FIG. 8 is a schematic, bottom elevation of a second embodiment of a backlight module.

As an embodiment shown in FIG. 3, the point sources 11 and the bottom surface 124 are in the Cartesian coordinate system. The point sources 11 are arranged in the Y-axis, and the central light source 11 is an origin of the Cartesian coordinate system. Thus, when $r_0$ is 10 microns, k is 0.005, and the width of the LGP 10 in the Y-axis is 20 centimeters, the dot size D of each diffusion dot 13 can be determined according to the above-mentioned equation. Specifically, FIG. 4 illustrates the sizes D (unit: micron) of the diffusion dots 13 with a distance of 0.01 meters away from the Y-axis (unit: meter); FIG. 5 illustrates the sizes D of the diffusion dots 13 with a distance of 0.03 meters away from the Y-axis; FIG. 7 illustrates the sizes D of the diffusion dots 13 with a distance of 0.05 meters away from the Y-axis; and FIG. 8 illustrates the sizes D of the diffusion dots 13 with a distance of 0.07 meters away from the Y-axis. The changing trend of the diffusion dots 13 is illustrated through FIGS. 4 to 8.

FIG. 8 is a view of a backlight module 50, according to a second embodiment. The backlight module 50 is similar to the backlight module of the backlight module 10, except that the point sources 11 are replaced by at least one linear source 51, such as a CCFL. Because the linear source 51 can be regarded as a combination of innumerable point light units 511, each with a length dl, the size D of the diffusion dots 53 can be expressed by the following equation:

$$D = r_0 + \frac{k}{\sqrt{\sum_{h=1}^{b}\sum_{j=1}^{m}\int_0^{l_m} f_h \frac{1}{(X-X_{lb})^2+(Y-Y_{lb})^2}dl + \sum_{j=1}^{m}\int_0^{l_m} \frac{1}{(X-X_l)^2+(Y-Y_l)^2}dl}},$$

wherein (X, Y), ($X_l$, $Y_l$), and ($X_{lb}$, $Y_{lb}$) respectively designate coordinates of the diffusion dot 53, coordinates of the linear source 51, and coordinates of images of the linear source 51 relative to reflective side surfaces 522 in the Cartesian coordinate system; m symbolizes the number of the linear sources 51; b equals the number of the reflective side surfaces 522; $l_m$ represents the length of the linear source 51; $f_h$ corresponds to the reflectivity of a corresponding side surface 522; h and j each designate the series of integers 1, 2, 3, etc.; and $r_0$ and k are constants whose values are related to predetermined specifications of the LGP 52, the linear source 51, and the distances between the linear source 51 and the LGP 52. In practice, values of $r_0$ and k can be determined via a simulating effect of the LGP 52, using optical simulating software. The systematic variation of the dot sizes D of the diffusion dots 53 enable the backlight module 50 to provide highly uniform illumination. As such, when considering the first and second embodiments as a whole, a dot area of each of the diffusion regions is inversely proportional to a summation of reciprocals of squares of distances between the diffusion regions and all light beams directly derived from either the light source or the side reflection surfaces (i.e., from any of such sources).

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A backlight module, comprising:
   a light source defining a plurality of light units configured for emitting light beams; and
   a light guide plate structured and arranged for transmitting the light beams, comprising:
      a light incident surface configured for receiving the light beams;
      an emission surface adjacent to the light incident surface, the emission surface being configured for emitting the light beams;
      a bottom surface opposite to the emission surface;
      a plurality of side surfaces connectively arranged between the emission surface and the bottom surface; and
      a plurality of diffusion units formed on the bottom surface, the diffusion units being structured and arranged for scattering the light beams;
   wherein a size of each diffusion unit is inversely proportional to a summation of a sum of reciprocals of squares of distances between the diffusion unit and each light unit and a sum of reciprocals of squares of distances between the diffusion unit and corresponding images of each light unit formed, respectively, by the side surfaces.

2. The backlight module as claimed in claim 1, wherein the light source comprises a plurality of point sources, each light unit being defined by a respective one of the point sources.

3. The backlight module as claimed in claim 2, wherein the point sources are light emitting diodes.

4. The backlight module as claimed in claim 2, wherein a dot size D of each diffusion unit is represented by the following equation:

$$D = r_0 + \frac{k}{\sqrt{\sum_{j=1}^{m}\sum_{i=1}^{n} f_h \frac{1}{(X-X_{ji})^2+(Y-Y_{ji})^2} + \sum_{i=1}^{n}\frac{1}{(X-X_i)^2+(Y-Y_i)^2}}},$$

wherein D designates the dot size of the diffusion dot; (X, Y), ($X_i$, $Y_i$), and ($X_{ji}$, $Y_{ji}$), respectively, represent coordinates of the diffusion dot, coordinates of the light units, and coordinates of images of the light units relative to the side surfaces in a Cartesian coordinate system; m corresponds to the number of side surfaces; n equals the number of light units; $f_h$ designates the reflectivity of a corresponding side surface; i and j each symbolize the series of integers 1, 2, 3, etc.; and $r_0$ and k are constants whose values are related to predetermined specifications of the light guide plate and the light source and a location of the light source.

5. The backlight module as claimed in claim 1, wherein the light source is a linear source, each of the light units is defined by a section of the linear source with a length of dl, a dot size D of each diffusion unit is represented by the following equation:

$$D = r_0 + \frac{k}{\sqrt{\sum_{h=1}^{b}\sum_{j=1}^{m}\int_0^{l_m} f_h \frac{1}{(X-X_{lb})^2+(Y-Y_{lb})^2}dl + \sum_{j=1}^{m}\int_0^{l_m}\frac{1}{(X-X_l)^2+(Y-Y_l)^2}dl}},$$

wherein (X, Y), (Xl, Yl), and (Xlb, Ylb), respectively, represent coordinates of the diffusion dot, coordinates of the light units, and coordinates of images of the light units relative to reflective side surfaces in a Cartesian coordinate system; m corresponds to the number of the linear source; b equals the number of the reflective side surfaces; lm designates the length of the linear source; $f_h$ designates the reflectivity of a corresponding side surface; h and j each symbolize the series of integers 1, 2, 3, etc.; and $r_0$ and k are constants whose values are related to predetermined specifications of the light guide plate and the light source and a location of the light source.

6. The backlight module as claimed in claim 1, wherein each diffusion unit is generally hemispherical or sub-hemispherical.

7. The backlight module as claimed in claim 1, wherein the diffusion units are convex protrusions.

8. The backlight module as claimed in claim 1, wherein the diffusion units are arranged in a generally uniform array on the bottom surface.

9. The backlight module as claimed in claim 1, further comprising a plurality of reflective elements respectively arranged adjacent the side surfaces of the light guide plate.

10. A backlight module, comprising:
- a light source defining a plurality of light units for directly emitting light beams; and
- a light guide plate for transmitting the light beams, comprising:
  - a light incident surface for receiving the light beams;
  - an emission surface adjacent to the light incident surface for emitting the light beams;
  - a plurality of side reflection surfaces laterally facing the incident surface and reflecting the light beams in the light guide plate;
  - a bottom surface opposite to the emission surface; and
  - a plurality of diffusion regions formed on the bottom surface for scattering the light beams;

wherein an area of each of said diffusion regions is inversely proportional to a summation of reciprocals of squares of distances between the diffusion regions and all light beams directly derived from any one of the light source and the side reflection surfaces.

* * * * *